United States Patent

Graebe et al.

[11] Patent Number: 5,315,346
[45] Date of Patent: May 24, 1994

[54] SCANNERS

[75] Inventors: Christopher M. Graebe, Berkhamstead; Paul C. Ward, Watford, both of Great Britain

[73] Assignee: Eastman Kodak Company, Rochester, N.Y.

[21] Appl. No.: 941,079

[22] PCT Filed: Apr. 4, 1991

[86] PCT No.: PCT/EP91/00638
§ 371 Date: Oct. 9, 1992
§ 102(e) Date: Oct. 9, 1992

[87] PCT Pub. No.: WO91/16663
PCT Pub. Date: Oct. 31, 1991

[30] Foreign Application Priority Data
Apr. 12, 1990 [GB] United Kingdom ............... 9008452

[51] Int. Cl.5 ............................. G03B 27/00
[52] U.S. Cl. ........................ 355/1; 355/71
[58] Field of Search ............ 355/1, 27, 32, 35, 38, 355/66, 71; 354/105; 352/192, 236; 250/271, 501, 571

[56] References Cited
U.S. PATENT DOCUMENTS
4,290,688  9/1981  Call ............................. 355/1
5,087,937  2/1992  Frick et al. ................... 355/1

FOREIGN PATENT DOCUMENTS
0178439  9/1985  Japan .......................... 355/1

Primary Examiner—Michael L. Gellner
Assistant Examiner—D. P. Malley
Attorney, Agent, or Firm—Francis H. Boos, Jr.

[57] ABSTRACT

Scanners for use in photofinishing operations are well-known. However, many known devices suffer from the problem of being bulky and/or having a limited range of functions. Described herein is a scanner (10) formed by a bundle of optical fibres which enables information on a film (12) to be determined. The bundle of optical fibres is divided into two sets, one which scans the film (12) through slit 1 for information relating to frame (20), and a second set which scans the film (12) through slits (2, 3, 4, 5) for other information such as DX codes (24), frame numbers or sprocket holes (26) contained in the edge (22) of the film (12). Information from the film (12) is passed to a computer (30) via an interface (28) and the information derived is used to actuate means (32).

4 Claims, 2 Drawing Sheets

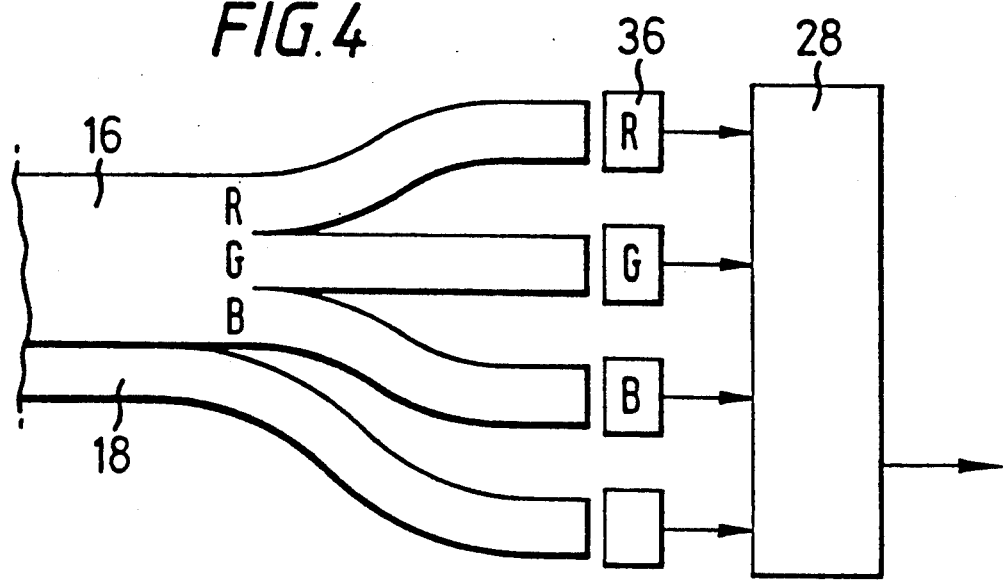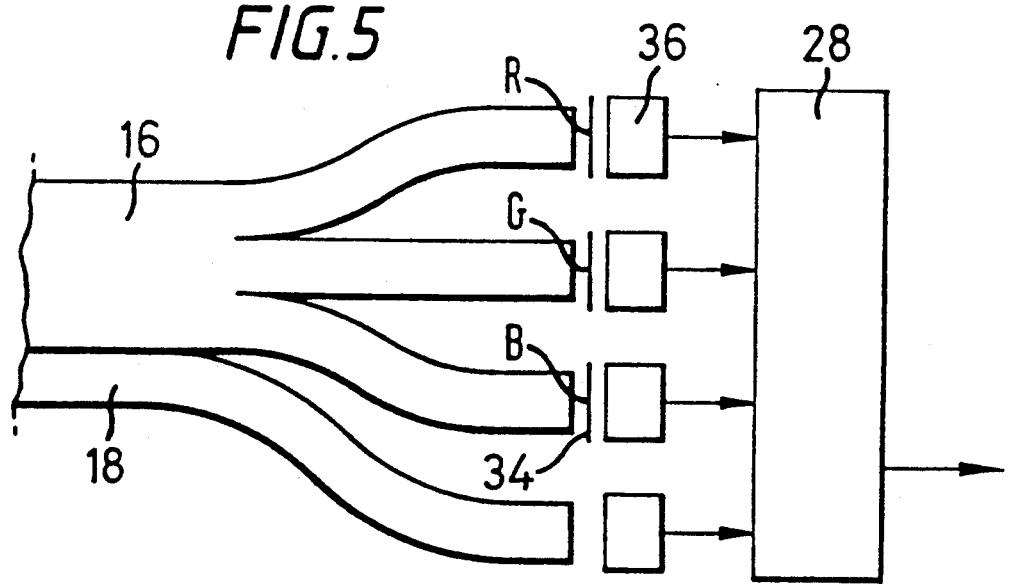

SCANNERS

This invention relates to scanners and is more particularly concerned with scanners for scanning 35 mm film in a photofinishing operation.

Various scanning devices are known for use in scanning 35 mm film in photofinishing operations but they devices have a limited range of functions or are very bulky.

FR-A-2 621 710 discloses a scanning device for scanning 35 mm film in a photofinishing operation in which a bundle of optical fibres are linearly arranged and are divided into two sets. The first set of optical fibres are arranged to scan frames of the film to sense frame content information, and the second set of optical fibres are arranged to sense film reference information adjacent to at least one edge of the film.

In accordance with the present invention, there is provided a scanning device as described above, characterized in that the second set of optical fibres comprises a portion arranged to sense illumination level information off the film.

Such a scanner may be used to produce a variety of different types of information, eg to control the position of a film in a printing gate (framing), to obtain the necessary dye density information to control printer exposure and to enable photographic film control strips to be measured (control strip densitometry), with a single, low cost, simple device. This can allow design of a very simple printer, use of existing exposure control algorithms, walk-away printing with high quality results, and possible retrofit to existing mini-labs.

The same scanner, with all these advantages, can further be adapted to be able to read at the same time the film DX code and frame numbers. For the latter purpose, the second set of optical fibres comprises a portion arranged to sense DX barcode information.

The second set of optical fibres may also comprise a portion arranged to sense occurrence of sprocket holes so that the densities in the film can be related in position to these.

The second set of optical fibres may further enhance the usefulness of the scanner by comprising a portion arranged to sense illumination level information off the film so as to provide a reference standard with which to compare the responses obtained by means of other parts of the scanner.

The first set of optical fibres may comprise means to provide colour information regarding a frame and the scanner may comprise means connected to this set to receive such information and to derive, from this colour information, frame position information, thereby obtaining two kinds of information from one set of signals and hence reducing the complexity of the scanning means, eg by using suitable back up circuitry.

In a preferred arrangement, successive fibres (or groups of fibres) of the linear arrangement in the first set are connected up optically to colour filters of correspondingly different colours, which enables a particularly simple and useful arrangement to result.

For a better understanding of the present invention, reference will now be made, by way of example only, to the accompanying drawings in which:

FIGS. 4 and 5 are diagrammatic representations of alternative embodiments of optical fibre channels connections for the scanner shown in FIG. 1.

Figure 1:
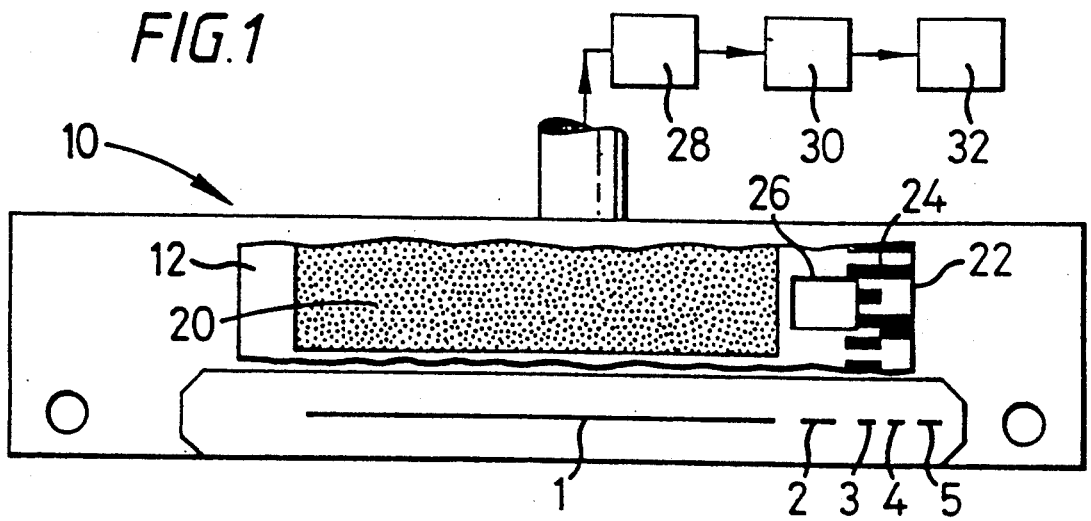
FIG. 1 is a bottom plan view of a scanner embodying the present invention with its optical face facing the reader.
Figure 2:
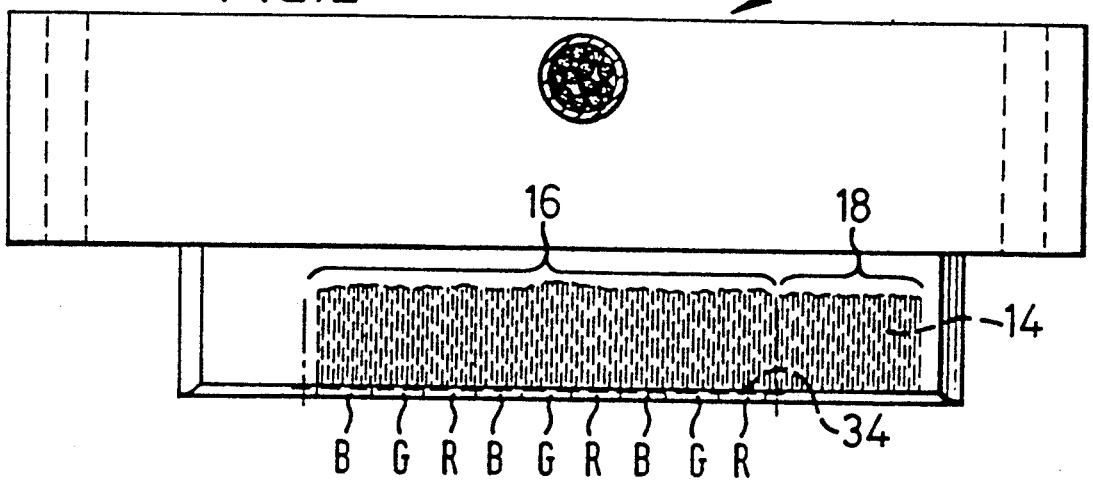
FIG. 2 is a side elevation of the scanner shown FIG. 1.
Figure 3:
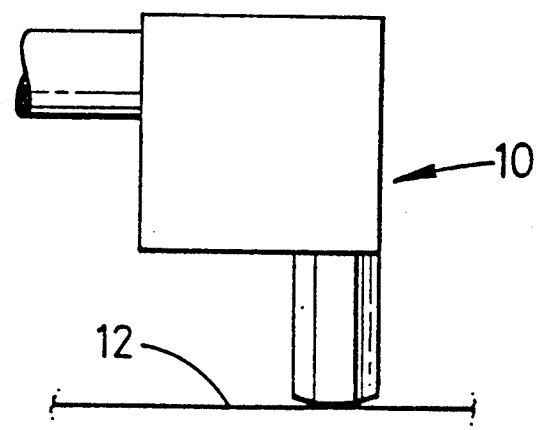
FIG. 3 is an end elevation of the scanner shown in FIGS. 1 and 2.

Referring to the FIGS. 1 to 3, a linear scanning device 10 is shown. Such a device 10 is used for scanning 35 mm film (referenced 12 in FIGS. 1 and 3) in a photofinishing operation. The device 10 comprises a bundle of optical fibres 14 arranged linearly so that the fibres scan through slits 1 to 5 as shown in FIG. 1. The bundle of optical fibres 14 is divided into at least two sets 16, 18 (as shown in FIG. 2). One set 16 of fibres is arranged for scanning frames 20 of the film 12 through slit 1 to sense frame content information. A second set 18 of fibres is arranged to sense film reference information adjacent to at least one edge 22 of the film 12.

The second set 18 of fibres scan the film 12 through Portions identified by the slits 2, 3, 4 and 5. Portions 3 and 4 are arranged to sense DX barcode information 24, portion 2 is arranged to sense occurrence of sprocket holes 26 and portion 5 is arranged to sense background illumination level beyond the edge of 22 of the film 12.

The first set 16 of optical fibres is arranged to scan colour information through slit 1 and is connected to an interface 28 to receive colour information regarding a frame from that set 16. This information is then transferred to a computer 30 which derives frame position information from this colour information. Computer 30 also obtains from interface 28 information derived from the various portions of the second set 18 of optical fibres. Computer 30 then provides the necessary information to means 32 which accordingly carries out control functions, data provision and any other functions which may be required.

Referring now to FIGS. 2 and 4, at the entrance (scanning) end of the optical fibres of the first set 16 are located red or green or blue colour filters 34 (FIG. 2) which are identified by respective references R, G, B in suitable proportions so that the quantities of cyan, magenta and yellow dye in the film can be measured and related to position and area in the film 12. Light passing along these fibres is sensed by photosensors 36 and corresponding signals pass to the interface 28.

In an alternative embodiment shown in FIG. 5, the colour filters 34 are located at the exit ends of the optical fibres of the first set 16 so that photosensors 36 are again responsive to respective colours red, green and blue and pass corresponding signals to the interface 28 as before.

We claim:

1. A scanning device (10) for scanning 35 mm film (12) in a photofinishing operation, the device comprising:
    a bundle of optical fibres (14) arranged linearly and divided into at least two sets (16, 18), a first set (16) of optical fibres being arranged to scan frames (20) of the film (12) to sense frame content information, and a second set (18) of optical fibres arranged to sense film reference information adjacent to at least one edge (22) of the film (12),
    characterized in that the second set (18) of optical fibres comprises a portion arranged to sense illumination level information off the film.

2. A device according to claim 1, characterized in that the the first set (16) of optical fibres is connected to provide colour information regarding a frame to control means (28, 30, 32) which uses this information to derive frame position information.

3. A device according to claim 1 or 2, characterized in that successive optical fibres or groups of optical fibres of the linear arrangement in the first set (16) are connected optically to colour filters (34) of correspondingly different colours.

4. A device according to any one of the preceding claims, characterized in that the second set (18) of optical fibres comprises a portion arranged to sense frame numbers.

* * * * *